US010447091B2

United States Patent
Takeda et al.

(10) Patent No.: US 10,447,091 B2
(45) Date of Patent: Oct. 15, 2019

(54) POWER TRANSMISSION UNIT OF WIRELESS POWER FEEDING DEVICE

(71) Applicant: DENSO WAVE INCORPORATED, Chita-gun, Aichi-pref. (JP)

(72) Inventors: Shigeru Takeda, Chita-gun (JP); Masayoshi Sugino, Nishio (JP); Takaomi Suzuki, Nishio (JP); Tatsuya Masamura, Kariya (JP)

(73) Assignee: DENSO WAVE INCORPORATED, Aichi-Pref., (JP)

( * ) Notice: Subject to any disclaimer, the term of this patent is extended or adjusted under 35 U.S.C. 154(b) by 86 days.

(21) Appl. No.: 15/867,189

(22) Filed: Jan. 10, 2018

(65) Prior Publication Data

US 2018/0205267 A1 Jul. 19, 2018

(30) Foreign Application Priority Data

Jan. 16, 2017 (JP) .................................. 2017-005074

(51) Int. Cl.
| | |
|---|---|
| H02J 4/00 | (2006.01) |
| H01F 38/14 | (2006.01) |
| H02J 50/12 | (2016.01) |
| H02J 7/02 | (2016.01) |
| H02J 50/40 | (2016.01) |

(52) U.S. Cl.
CPC .............. H02J 50/12 (2016.02); H02J 7/025 (2013.01); H02J 50/40 (2016.02)

(58) Field of Classification Search
CPC ............. H02J 50/40; H02J 50/12; H02J 7/025
See application file for complete search history.

(56) References Cited

U.S. PATENT DOCUMENTS

| | | | | | |
|---|---|---|---|---|---|
| 5,821,731 | A | * | 10/1998 | Kuki ..................... | H02J 7/0045 320/108 |
| 9,859,051 | B2 | * | 1/2018 | Ren ........................ | H01F 38/14 |
| 2008/0297107 | A1 | * | 12/2008 | Kato .................... | H01F 27/2871 320/108 |
| 2010/0315039 | A1 | * | 12/2010 | Terao ..................... | H01F 38/14 320/108 |
| 2012/0032632 | A1 | * | 2/2012 | Soar ....................... | H01F 38/14 320/108 |

(Continued)

FOREIGN PATENT DOCUMENTS

JP 2015-122920 A 7/2015

*Primary Examiner* — Jared Fureman
*Assistant Examiner* — Esayas G Yeshaw
(74) *Attorney, Agent, or Firm* — Oliff PLC

(57) ABSTRACT

A power transmission unit of a wireless power feeding device supplies power to two or more moving bodies wirelessly by using magnetic field resonance. The power transmission unit includes a power transmission coil, a high frequency generation unit, capacitor circuit groups, and a control unit. The capacitor circuit groups have series capacitors connected in series with the power transmission coil and parallel capacitors connected in parallel to the switching elements for generating a high frequency, and the capacitor circuit groups are set together with the power transmission coil so as to have different impedances to each other. The control unit that controls a switch for connecting and disconnecting the capacitor circuit groups according to the number of the moving bodies to which electrical power is supplied from the power transmission coil.

7 Claims, 6 Drawing Sheets

(56) References Cited

U.S. PATENT DOCUMENTS

| | | | |
|---|---|---|---|
| 2013/0049471 A1* | 2/2013 | Oleynik | H02J 3/01 307/65 |
| 2013/0154384 A1* | 6/2013 | Nakamura | H01F 38/14 307/104 |
| 2015/0224883 A1* | 8/2015 | Ichikawa | B60L 50/40 320/108 |
| 2015/0326028 A1* | 11/2015 | Suzuki | H02J 7/025 307/104 |
| 2017/0133880 A1* | 5/2017 | Wakisaka | H02J 50/80 |
| 2018/0062430 A1* | 3/2018 | Matsumoto | H02J 7/00 |

* cited by examiner

POWER TRANSMISSION UNIT OF WIRELESS POWER FEEDING DEVICE

CROSS-REFERENCE TO RELATED APPLICATION

This application is based on and claims the benefit of priority from earlier Japanese Patent Application No. 2017-005074 filed Jan. 16, 2017, the description of which is incorporated herein by reference.

TECHNICAL FIELD

The present disclosure relates to a power transmission unit of a wireless power feeding device that wirelessly feeds electrical power to a moving body used in equipment.

BACKGROUND

In recent years, use of a wireless power feeding device that wirelessly feeds electrical power from a power transmission side to a power reception side as a means for transmitting power is progressing.

This wireless power feeding device can also be used for supplying electrical power between equipment such as a factory and a moving body such as an AGV (Auto Guided Vehicle) or a robot used in this facility.

The moving bodies such as the AGV and the robot move along a structural surface such as a floor surface or a wall surface of the facility.

The moving body receives electrical power from a power transmission coil of a power transmission unit provided on the structural surface through a power receiving coil.

In this case, an overall length of the power transmission coil for supplying electrical power is set so that electrical power can be fed to a plurality of moving bodies simultaneously.

That is, electrical power can be fed to the plurality of moving bodies simultaneously by the power transmission coil opposing the power receiving coil of the moving body.

However, in a case of wireless feeding utilizing magnetic field resonance, an impedance of the power transmission coil varies depending on the number of moving bodies.

When magnetic field resonance is used, so-called impedance matching for optimizing the impedance is required.

However, when the number of moving bodies to which electrical power is fed varies as described above, with the impedance optimized for one moving body, the impedance changes when electrical power is fed to two moving bodies, and there is a problem that power transmission efficiency decreases.

Conversely, with the impedance optimized for the two moving bodies, the power transmission efficiency for one moving body is decreased.

Furthermore, similar problems arise in a case of three or more moving bodies.

In order to solve such a problem, Japanese Patent Application Laid-Open Publication No. 2015-122920 (Patent Document 1) proposes an impedance matching by making a winding ratio of a variable transformer, that is, the number of turns of a coil variable.

However, in a case of magnetic field resonance utilizing a high frequency in a MHz region, if the variable transformer is used as in Patent Document 1, there is a problem that core losses become large and transmission efficiency is lowered.

In addition, transformers are large in size, and there is a problem that it is difficult to apply the transformers to wireless power feeding devices of AGVs and robots, which are intended to be installed in facilities such as factories.

That is, when installing the wireless power feeding device in a facility such as a factory, it is required to reduce the installation volume due to problems such as interference with surrounding equipment, and therefore it is difficult to use a transformer that is large in size.

Furthermore, since transformers utilize physical windings, there is a problem that it is difficult to ensure accuracy, and is difficult to match the impedances strictly.

SUMMARY

An embodiment provides a power transmission unit of the wireless power feeding device that is capable of impedance matching according to a change in a number of power reception sides with high accuracy and without increasing size, and with high transmission efficiency.

According to a first aspect of the present disclosure, a power transmission unit of a wireless power feeding device includes capacitor circuit groups having series capacitors and parallel capacitors.

The capacitor circuit groups are provided according to the number of the moving bodies to be supplied with electric power. That is, two capacitor circuit groups are provided when the maximum number of moving bodies to be supplied with electric power simultaneously is two, and three capacitor circuit groups are provided in the case of three moving bodies.

Then, in each of the plurality of capacitor circuit groups, the impedance generated together with the power transmission coil is different to each other. That is, in each capacitor circuit group, impedance matching must be performed according to the number of moving bodies to be supplied with electric power.

The control unit controls switches for connecting and disconnecting between the capacitor circuit groups according to the number of moving bodies being fed from the power transmission coil.

For example, when there is only one moving body to be supplied with electric power from the power transmission coil, the control unit connects the switches of the capacitor circuit groups for which impedance matching is performed for one moving body.

That is, when n (n≥2) moving bodies being fed from the power transmission coil are present, for example, the control unit closes the switches of the n sets of capacitor circuit groups for which impedance matching is being performed on the n moving bodies.

As a result, even when the number of moving bodies to be supplied with electric power from the power transmission coil varies, the optimized capacitor circuit groups and the power transmission coil are always connected, and impedance matching is achieved.

Therefore, the power transmission efficiency can be increased irrespective of the number of moving bodies.

Further, in the case of the disclosure described in the first aspect, the impedance is set by the capacitances of the series capacitors and the parallel capacitors.

Since the capacitors used for the series capacitor and the parallel capacitors do not require windings, they are small in size and high in capacitance accuracy.

Therefore, the accuracy can be increased, and impedance matching can be performed according to the change in the number the power receiving side moving bodies without increasing the size.

According to a second aspect of the disclosure, the control unit controls the switches according to the current flowing from the main power source to the power transmission coil detected by the current sensor.

As the number of moving bodies being fed increases, the current flowing from the main power source to the power transmission coil increases.

Accordingly, the number of moving bodies opposing the power transmission coil, that is, the number of moving bodies being fed from the power transmission coil is detected by the current flowing from the main power source to the power transmission coil.

Therefore, the control unit automatically controls the switches of the capacitor circuit groups according to the number of moving bodies detected based on the current.

As a result, even if the number of moving bodies varies, impedance matching can be promptly and reliably performed, and transmission efficiency can be improved.

According to a third aspect of the disclosure, the control unit controls the switch according to the specification of the moving body read by the reading unit from the storage unit disposed in the moving body.

In moving bodies, the electrical characteristics of devices mounted therein are different for each individual.

For example, when electrical power received by a moving body from a power transmission coil is stored in a storage battery, electrical characteristics are different for each specification of the storage battery, and impedance is also different.

Therefore, the storage unit stores the characteristics of each individual moving body.

Then, the control unit selects the optimized capacitor circuit groups according to the characteristics of each individual moving body. That is, the control unit automatically controls capacitor switching in accordance with not only the number of moving bodies but also the electrical characteristics thereof.

Therefore, even if the number of moving bodies varies, impedance matching can be promptly and reliably performed, and transmission efficiency can be improved.

According to a fourth aspect of the disclosure, the control unit controls the switches according to a length of the power transmission coil.

The total length of the power transmission coil supplying electrical power increases as the number of moving bodies being fed increases. That is, when magnetic field resonance occurs between the power transmission coil and the opposing power receiving coil, the impedance decreases in a portion where the magnetic field resonance occurs.

Therefore, as the number of moving bodies transmitting power increases, the length of a portion where the impedance drops, that is, the total length of the operating power transmission coil increases even if the total length of the power transmission coil is constant.

The electrical characteristics change and the impedance also changes when the total length of the power transmission coil changes.

Therefore, the control unit detects the number of moving bodies from the total length of the operating power transmission coil, and selects the optimized capacitor circuit groups according to this length.

Therefore, the control unit automatically controls the switches of the capacitor circuit groups according to the length of the power transmission coil which changes according to the number of the moving bodies.

Therefore, even if the number of moving bodies varies, impedance matching can be promptly and reliably performed, and transmission efficiency can be improved.

According to a sixth aspect of the disclosure, the capacitor circuit groups are electrically detachable from the high frequency generation unit.

The capacitor circuit groups are disposed detachably from the high frequency generation unit by, for example, connection using a coupler or the like.

Thereby, when the impedance characteristics of the moving body are changed, impedance matching can be performed by changing the capacitor circuit group disposed on a substrate, for example, without changing fundamental parts of the power transmission unit such as the high frequency generation unit and the power transmission coil.

Therefore, impedance matching can be easily and conveniently performed according to the characteristics of the moving body.

According to a seventh aspect of the present disclosure, two MOSFETs are mutually inverted in their drive signals and are connected to the power transmission coils, respectively.

As a result, voltages are alternately applied to both ends of the power transmission coil.

Therefore, the current flowing through the power transmission coil can be increased, and the transmission efficiency can be improved.

Further, capacitor circuit groups constituted by the series capacitors and the parallel capacitors corresponding to the number of moving bodies are connected to drains of the two MOSFETs.

Capacitances of the series capacitors and the parallel capacitors constituting the capacitor circuit groups are uniquely determined by equations.

Therefore, it is easy to set the capacitance of each capacitor according to the number of moving bodies, and it is possible to miniaturize the module, thereby enabling downsizing of a mounting size.

DETAILED DESCRIPTION OF THE PREFERRED EMBODIMENT

Figure 1:
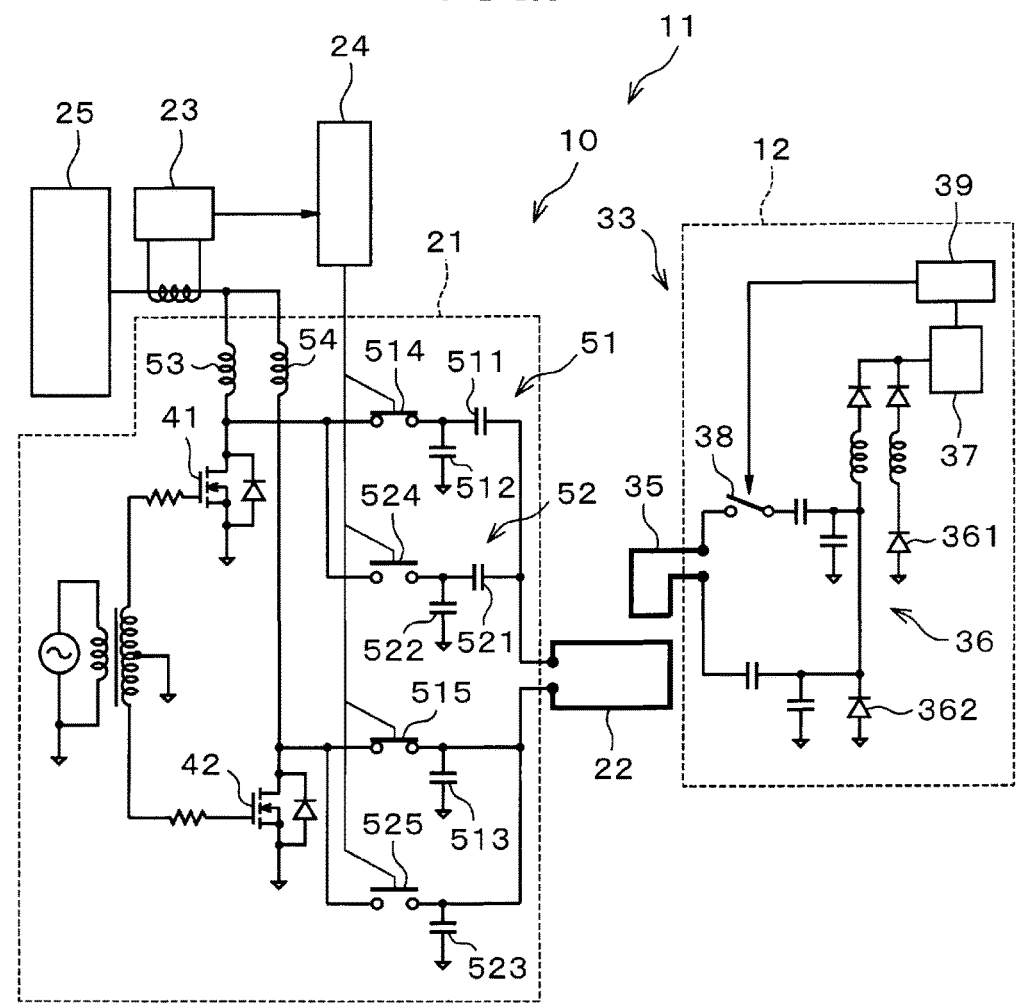
FIG. 1 shows a schematic diagram of an electrical circuit of a power transmission unit of a wireless power feeding device according to a first embodiment.

Hereinafter, a plurality of embodiments of a wireless power feeding device to which a power transmission unit is applied will be described with reference to the drawings.

It should be noted that substantially the same constituent parts are denoted by the same reference numerals, and description thereof is omitted in the embodiments.

First Embodiment

Figure 2:
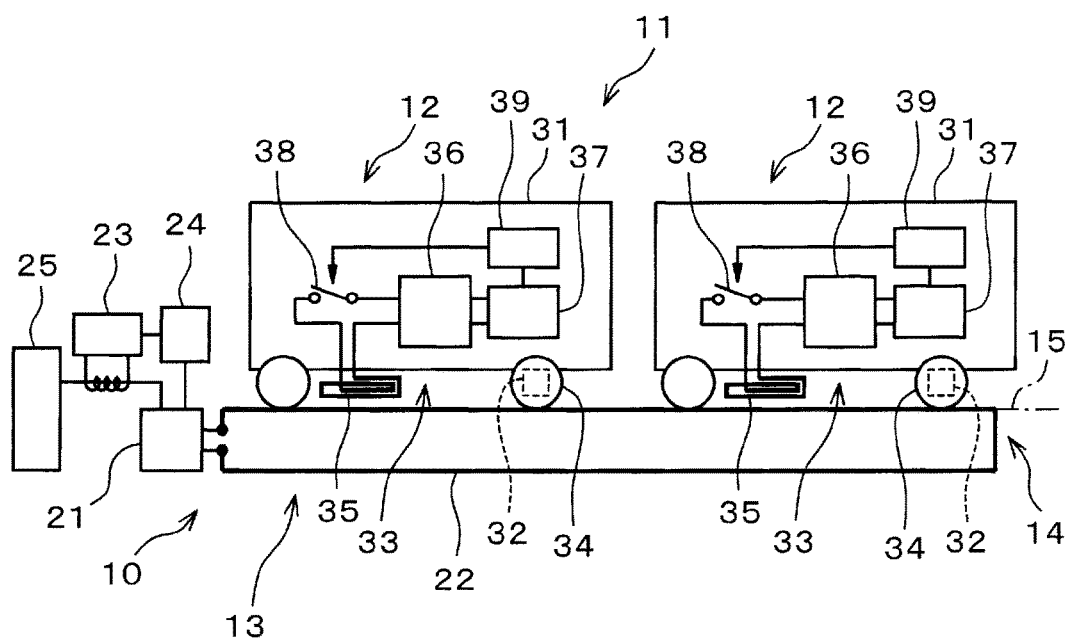
FIG. 2 shows a schematic diagram of a charging system to which the power transmission unit of the wireless power feeding device according to the first embodiment is applied.

A wireless power feeding device 11 to which a power transmission unit 10 according to a first embodiment is applied is shown in FIG. 2.

The wireless power feeding device 11 includes the power transmission unit 10 and two or more moving bodies 12.

Incidentally, in the first embodiment including FIG. 2, an example of the wireless power feeding device 11 including two moving bodies 12 is shown for the sake of simplicity of explanation. Therefore, the wireless power feeding device 11 is not limited to include the two moving bodies 12, and three or more moving bodies 12 may be provided.

The moving body 12 is, for example, an AGV (Auto Guided Vehicle) used in facilities such as factories. The two moving bodies 12 have the same structure. The power transmission unit 10 is disposed in a charging region 13.

The charging region 13 is disposed on a structural surface 15 of a facility 14 such as a factory. The structural surface 15 is not limited to a floor surface of the facility 14 but may be a wall surface.

The power transmission unit 10 includes a high frequency generation unit 21, a power transmission coil 22, a current sensor 23, and a control unit 24.

The high frequency generation unit 21 is connected to a main power source 25. The high frequency generation unit 21 constitutes, for example, an inverter, and generates electrical power of high frequency set in advance by using electrical power from the main power source 25.

The power transmission coil 22 is a thin plate-like planar coil, and is disposed on a floor surface or the like in the charging region 13 of a facility to which the wireless power feeding device 11 is applied. The power transmission coil 22 is supplied with the high frequency power generated by the high frequency generation unit 21.

The current sensor 23 is disposed between the main power source 25 and the high frequency generation unit 21, and detects a current flowing between the main power source 25 and the high frequency generation unit 21. The current sensor 23 outputs the detected current to the control unit 24.

The control unit 24 is composed of, for example, a microcomputer having a CPU, a ROM, and a RAM, and controls the power transmission unit 10 by software.

It should be noted that the control unit 24 may be configured as an electrical circuit by hardware or may be configured to be operated by cooperation between software and hardware.

The moving body 12 includes a vehicle body 31, a drive unit 32, and a power receiving unit 33.

The vehicle body 31 is driven along a route set in advance in the facility by the drive unit 32. The moving body 12 travels by driving wheels 34 with the drive unit 32.

The power receiving unit 33 includes a power receiving coil 35, a rectification circuit unit 36, a battery 37, a switch 38, and a control circuit unit 39.

The power receiving coil 35 is provided on a bottom surface of the vehicle body 31, for example, and faces the power transmission coil 22 of the power transmission unit 10 disposed on the floor surface of the facility.

Thereby, when the high frequency generated by the high frequency generation unit 21 is supplied to the power transmission coil 22, a magnetic field resonance is generated between the power transmission coil 22 and the power receiving coil 35.

By utilizing this resonance, power is transmitted from the power transmission coil 22 to the power receiving coil 35 wirelessly. That is, the power receiving unit 33 of the moving body 12 receives electrical power from the power transmission unit 10 by wireless electrical power supply that utilizes magnetic field resonance.

The rectifier circuit unit 36, the battery 37, the switch 38, and the control circuit unit 39 are mounted on the vehicle body 31.

The rectification circuit unit 36 rectifies the high frequency power received from the power transmission unit 10 by the power receiving coil 35 into direct current.

The battery 37 stores the electrical power rectified by the rectification circuit unit 36.

The battery 37 is constituted by a well-known secondary battery such as a lithium ion battery, for example.

The switch 38 connects and disconnects an electrical circuit of the power receiving unit 33 including the power receiving coil 35.

The control circuit unit 39 is composed of, for example, a microcomputer having a CPU, a ROM, and a RAM, and controls the power receiving unit 33 in the moving body 12 by software. Further, the control circuit unit 39 also controls the traveling of the moving body 12 by controlling the driving unit 32.

It should be noted that the control circuit unit 39 may be configured as an electrical circuit by hardware or may be configured to be operated by cooperation between software and hardware.

The control circuit unit 39 detects an amount of charge in the battery 37 and turns on or off the switch 38 according to the detected amount of charge of the battery 37. That is, the control circuit unit 39 turns the switch 38 on when charging capacity remains in the battery 37, and executes reception of power by the power receiving coil 35.

On the other hand, the control circuit unit 39 turns the switch 38 off when the battery 37 does not have any charging capacity, that is, when the battery 37 is fully charged, and stops reception of power by the power receiving coil 35.

In this manner, the control circuit unit 39 controls the charging of the battery 37 by turning the switch 38 on or off according to the charging capacity of the battery 37.

The moving body 12 is driven by the drive unit 32 using electrical power stored in the battery 37.

Next, an electrical configuration of the wireless power feeding device 11 will be described with reference to FIG. 1.

[Power Transmission Unit]

The power transmission unit 10 includes the high frequency generation unit 21 as described above.

The high frequency generation unit 21 is connected to the power transmission coil 22. The high frequency generation unit 21 has a switching element 41 and another switching element 42 for generating a high frequency based on the electrical power supplied from the main power source 25.

The high frequency generation unit 21 generates a high frequency by switching the switching element 41 and the switching element 42. The switching element 41 and the switching element 42 are formed of MOSFETs.

In a case of the first embodiment, the high frequency generation unit 21 has two sets of capacitor circuit groups constituted of a first capacitor circuit group 51 and a second capacitor circuit group 52 corresponding to two moving bodies 12, respectively.

The first capacitor circuit group 51 has a capacitor 511 connected in series with the power transmission coil 22. The capacitor 511 constitutes an LC oscillation circuit together with the power transmission coil 22.

As a result, the power transmission coil 22 produces the high frequency oscillation generated by switching of the switching element 41 and the switching element 42.

The capacitor 511 is series capacitors. Further, the first capacitor circuit group 51 includes a capacitor 512 and another capacitor 513. The capacitor 512 and the capacitor 513 are connected in parallel with the switching element 41, the switching element 42, and the power transmission coil 22. The capacitor 512 and the capacitor 513 are parallel capacitors.

The first capacitor circuit group 51 includes a switch 514 and another switch 515. The switch 514 connects and disconnects between the switching element 41 and the power transmission coil 22. Similarly, the other switch 515 connects and disconnects between the switching element 42 and the power transmission coil 22. The switch 514 and the switch 515 may be mechanical switches, or switching elements may be used.

The second capacitor circuit group 52 substantially has an electrical circuit configuration in common with the first capacitor circuit group 51.

Specifically, the second capacitor circuit group 52 has a capacitor 521 connected in series with the power transmission coil 22.

The capacitor 521 constitutes an LC oscillation circuit together with the power transmission coil 22. As a result, the power transmission coil 22 produces the high frequency oscillation generated by switching of the switching element 41 and the switching element 42.

The capacitor 521 is series capacitors. In addition, the second capacitor circuit group 52 includes a capacitor 522 and another capacitor 523. The capacitor 522 and the capacitor 523 are connected in parallel with the switching element 41 and the switching element 42. The capacitor 522 and the capacitor 523 are parallel capacitors.

The second capacitor circuit group 52 includes a switch 524 and another switch 525. The switch 524 connects and disconnects between the switching element 41 and the power transmission coil 22. Similarly, the other switch 525 connects and disconnects between the switching element 42 and the power transmission coil 22. The switch 524 and the switch 525 may be mechanical switches, or switching elements may be used.

The control unit 24 turns on or off the switch 514, the switch 515, the switch 524, and the switch 525 of the high frequency generation unit 21 based on the current detected by the current sensor 23.

Specifically, the control unit 24 turns the switch 514 and the switch 515 on when using the first capacitor circuit group 51 for oscillation of the power transmission coil 22, and turns the switch 524 and the switch 525 off.

On the other hand, the control unit 24 turns the switch 514 and the switch 515 off and turns the switch 524 and the switch 525 on when the second capacitor circuit group 52 is used for oscillation of the power transmission coil 22.

Accordingly, the high frequency generation unit 21 constitutes an electrical circuit including the switching element 41, the capacitor 511, the power transmission coil 22, and the switching element 42 when using the first capacitor circuit group 51, and the capacitor 512 and the capacitor 513 are included in parallel with the circuit.

On the other hand, the high frequency generation unit 21 constitutes an electrical circuit including the switching element 41, the capacitor 521, the power transmission coil 22, and the switching element 42 when using the second capacitor circuit group 52, and the capacitor 522 and the capacitor 523 are included in parallel with the circuit.

The switching element 41 is connected to the main power source 25 via a choke coil 53. Similarly, the switching element 42 is connected to the main power source 25 via another choke coil 54. The switching element 41 and the switching element 42 are driven with mutually opposite phases.

In each of the switching element 41 and the switching element 42, a respective drain of the MOSFET is connected to the power transmission coil 22.

In addition, the capacitors of the first capacitor circuit group 51 and the second capacitor circuit group 52 are connected between the switching element 41 and the power transmission coil 22, and between the switching element 42 and the power transmission coil 22, respectively.

In addition, the capacitor 512, the capacitor 513, the capacitor 522, and the capacitor 523, which are parallel capacitors, are connected in parallel to each of the switching element 41 and the switching element 42.

[Power Receiving Unit]

The power receiving unit 33 includes the rectification circuit unit 36. The rectification circuit unit 36 is connected to the power receiving coil 35. The rectifying circuit section 36 includes a rectifying element 361 and another rectifying element 362 for rectifying the high frequency received by the power receiving coil 35.

The rectifying element 361 and the rectifying element 362 are generally diodes. The rectification circuit unit 36 converts the high frequency power into a direct current by the rectifying element 361 and the rectifying element 362.

The rectification circuit unit 36 is connected to the battery 37. The electrical power rectified by the rectification circuit unit 36 is stored in the battery 37.

[Operation of Control Unit]

The control unit 24 switches the switches 514 and 515 and the switches 524 and 525 on or off by the current detected by the current sensor 23.

The power transmitted from the power transmission coil 22 of the power transmission unit 10 to the power receiving coil 35 of the power receiving unit 33 in the moving body 12 varies depending on the number of the moving bodies 12.

That is, the power transmitted from the power transmission coil 22 to the power receiving coil 35 varies depending on the number of the moving bodies 12 that generate the magnetic field resonance with the power transmission coil 22.

Therefore, the power consumed by the high frequency generation unit 21 also varies depending on the number of the moving bodies 12. That is, as the number of moving bodies 12 increases, the power consumed by the high frequency generation unit 21 also increases.

Thereby, the current detected by the current sensor 23 increases as the number of the moving bodies 12 increases.

Therefore, a magnitude of the current detected by the current sensor 23 correlates with the number of the power receiving coils 35 receiving the power from the power transmission coil 22, that is, the number of the moving bodies 12.

Then, the control unit 24 detects the number of the moving bodies 12 to which electrical power is supplied according to the magnitude of the current detected by the current sensor 23, and operates the switch 514, the switch 515, the switch 524 and the switch 525.

When using magnetic field resonance, impedance optimization, that is, impedance matching is required between the power transmission coil 22 and the power receiving coil 35.

When no impedance matching is made between the power transmission coil 22 and the power receiving coil 35, there are problems that no magnetic field resonance occurs between the power transmission coil 22 and the power receiving coil 35, or even if magnetic field resonance occurs, the power transmission efficiency significantly lowers.

On the other hand, the impedance matching between the power transmission coil 22 and the power receiving coil 35 is set on a one-to-one basis between the power transmission coil 22 and the power receiving coil 35.

Therefore, when the impedance matching is performed between the power transmission coil 22 and the power receiving coil 35 with respect to one moving body 12, for example, impedance deviates from the optimum range when the number of the mobile bodies 12 to be supplied with electric power becomes two.

On the other hand, when the impedance matching is performed between the power transmission coil 22 and the power receiving coil 35 with respect to the two moving bodies 12, the impedance deviates from the optimum range when the number of the moving bodies 12 to be supplied with electric power becomes one.

Therefore, when the number of moving bodies 12 to be supplied with electric power is changed as in the first embodiment, when the impedance matching is performed for a particular number of moving bodies, the impedance for other numbers of moving bodies deviates from the optimum range, and as a result, the power transmission efficiency decreases.

In the first embodiment, the control unit 24 switches between the first capacitor circuit group 51 and the second capacitor circuit group 52 based on the current detected by the current sensor 23 as described above.

That is, in the case of the first embodiment, the capacitor 511, the capacitor 512, and the capacitor 513 in the first capacitor circuit group 51 are set to have capacitances that can optimize the impedance when supplying electrical power to one moving body 12.

On the other hand, the capacitor 521, the capacitor 522, and the capacitor 523 in the second capacitor circuit group 52 are set to capacitances that can optimize the impedance when supplying electrical power to two moving bodies 12, for example.

Accordingly, the control unit 24 detects the current by the current sensor 23, thereby detecting the number of the moving bodies 12 to be charged, and according to the number of the moving bodies 12 detected, the control unit 24 switches between the first capacitor circuit group 51 and the second capacitor circuit group 52.

As a result, an optimum circuit system in the power transmission unit 10 is automatically selected according to the number of the moving bodies 12 to be supplied with electric power that enter the charging region 13 for charging.

In the first embodiment, by connecting the capacitor 512 or the capacitor 513, or the capacitor 522 or the capacitor 523 in parallel with the switching element 41 and the switching element 42, a winding such as a transformer, for example, is unnecessary.

Therefore, in the first embodiment, it is easy to miniaturize the power transmission unit 10, and an accuracy of a capacitance of each capacitor also increases.

As a result, the impedance of the power transmission coil 22 can be adjusted with high accuracy.

Here, a capacitance Cc of the capacitor 511 and the capacitor 521 which are series capacitors, and a capacitance Cl of the capacitors 512, 513, 522, 523 which are parallel capacitors are calculated by the following expressions.

$$Cc = \frac{\omega}{2Q_L}\left(l_1 - \frac{M^2}{l_2} - \frac{2Q_L}{\omega} \cdot R_c\right)$$ [Math. 1]

$$Cl = \frac{\alpha \cdot Q_L}{\omega^2 \cdot L} - C_{oss}$$

Here, $\omega$ is an angular velocity, and when the oscillation frequency is $f_0$, $\omega=2nf_0$ is calculated; $Q_L$ is a circuit resonance value; $I_1$ is an inductance of a power transmission coil; $I_2$ is an inductance of a receiving coil; M is a mutual inductance, and $M=k(I_1 \times I_2)^{1/2}$; $R_c$ is an impedance of a circuit; $C_{oss}$ is an output capacitance of a switching element; and $\alpha$ is a coefficient, which is a characteristic value of a oscillation circuit.

In the above equation, L is an inductance of a power transmission coil and is calculated by the following equation.

[Math. 2]

$$L = \frac{1}{2}\left(l_1 - \frac{1}{\omega^2 \cdot Cc} - \frac{M^2}{l_2}\right)$$

According to the above equations, the capacitance Cc of the capacitor 511 and the capacitor 521 which are series capacitors, and the capacitance Cl of the capacitors 512, 513, 522, 523 which are parallel capacitors are calculated.

Therefore, the capacitor 511 which is the series capacitor of the first capacitor circuit group 51 and the capacitor 521 which is the series capacitor of the second capacitor circuit group 52 are set to different capacitances according to the impedance which changes according to the number of the moving bodies 12.

Likewise, the capacitors 512, 513 which are parallel capacitors of the first capacitor circuit group 51 and the capacitors 522, 523 which are parallel capacitors of the second capacitor circuit group 52 are set to different capacitances according to the impedance which changes according to the number of the moving bodies 12.

Next, the operation of the wireless power feeding device 11 according to the first embodiment will be described.

The moving body 12 circulates through a route set in advance in the facility. Then, at the specific time, the mobile unit 12 moves to the charging area 13 where the power transmission unit 10 is disposed.

Upon reaching the charging region 13, the moving body 12 is fed from the power transmission unit 10. At this time, the control circuit unit 39 of the moving body 12 turns on or off the switch 38 based on the charge capacity of the battery 37.

As a result, the power receiving unit 33 receives power from the power transmission unit 10 wirelessly by magnetic field resonance when the chargeable capacity of the battery 37 remains in the power receiving unit 33 of the moving body 12.

The power received by the power receiving unit 33 is rectified by the rectification circuit unit 36 and then charged to the battery 37.

Two or more moving bodies 12 can enter the charging region 13. Two moving bodies 12 can enter the charging region 13 in the case of the first embodiment.

Therefore, the power transmission unit 10 executes any one of power transmission to one moving body 12, power transmission to two moving bodies 12, and suspension of power transmission to both of the two moving bodies 12.

Even when two moving bodies 12 are entering the charging region 13, when there is no remaining chargeable capacity in the battery 37 of one of the moving bodies 12, the power transmission to the subject moving body 12 from the power transmission unit 10 is not performed.

Therefore, even when two moving bodies 12 are entering the charging area 13, the power transmission may be performed only to one mobile unit 12.

In this way, electrical power is transmitted to one or two moving bodies 12 in the charging region 13.

The control unit 24 of the power transmission unit 10 detects the number of moving bodies 12 to which electrical power is fed from the power transmission coil 22 in the charging area 13 based on the magnitude of the current flowing from the main power source 25 to the high frequency generation unit 21.

Then, when it is determined that one moving body 12 is supplied with electrical power in the charging region 13, the controller 24 drives the switches 514, 515, 524, and 525 to connect the power transmission coil 22 to the first capacitor circuit group 51.

Thereby, the impedance of the power transmission coil 22 is optimized so as to correspond to one moving body 12 by the first capacitor circuit group 51.

On the other hand, when it is determined that two moving bodies 12 in the charging area 13 are supplied with electrical power, the control unit 24 drives the switches 514, 515, 524, and 525 to connect the power transmission coil 22 to the second capacitor circuit group 52.

Thereby, the impedance of the power transmission coil 22 is optimized so as to correspond to the two moving bodies 12 by the second capacitor circuit group 52.

Furthermore, when there is no moving body 12 to be supplied with electrical power in the charging area 13, the control unit 24 turns off all of the switches 514, 515, 524, and 525 to cut off the connection between the high frequency generation unit 21 and the power transmission coil 22. As a result, the power transmission coil 22 stops oscillation without consuming unnecessary power.

In the first embodiment described above, the high frequency generation unit 21 of the power transmission unit 10 is provided with the first capacitor circuit group 51 and the second capacitor circuit group 52.

In the first capacitor circuit group 51, the capacitances of the capacitors 511, 512 and 513 are set so that the impedance is optimized when there is only one moving body 12 is object to receive electrical power.

Further, in the second capacitor circuit group 52, the capacitances of the capacitors 521, 522, and 523 are set so that the impedance is optimized when two moving bodies 12 are object to receive electrical power.

The control unit 24 controls switches 514, 515, 524, and 525 for connecting and disconnecting the first capacitor circuit group 51 or the second capacitor circuit group 52 according to the number of the moving bodies 12 to which the power is supplied from the power transmission coil 22.

As a result, even if the number of moving bodies 12 to which the power is supplied from the power transmission coil 22 varies, an optimized capacitor circuit group is always connected to the power transmission coil 22, and the impedance matching is achieved.

Therefore, regardless of the number of the moving bodies 12, the power transmission efficiency can be increased.

The impedances of the first capacitor circuit group 51 and the second capacitor circuit group 52 in the first embodiment are set according to the capacitors 511 and 521 connected in series to the power transmission coil 22, and the capacitors 512, 513, 522, and 523 connected in parallel with the power transmission coil 22 and the switching elements 41.

Since these capacitors 511, 512, 513, 521, 522, and 523 do not need windings unlike a transformer, they are small in size and high in capacitance accuracy.

Therefore, the accuracy can be increased, and the impedance can be optimized according to the change in the number of the power receiving side moving bodies 12 without increasing the size.

The control unit 24 controls the switches 514, 515, 524, and 525 according to the current flowing from the main power source 25 to the power transmission coil 22 detected by the current sensor 23 in the first embodiment.

The current flowing from the main power source 25 to the power transmission coil 22 increases when the number of moving bodies 12 to which electrical power is fed increases.

Accordingly, the number of moving bodies 12 opposing the power transmission coil 22, that is, the number of moving bodies 12 to which electrical power is fed from the power transmission coil 22 is detected by the current flowing from the main power source 25 to the power transmission coil 22.

Therefore, the control unit 24 automatically controls the switches 514, 515, 524, and 525 according to the number of the moving bodies 12 detected based on the current.

As a result, even if the number of moving bodies 12 varies, the impedance can be optimized promptly and reliably, and the power transmission efficiency can be improved.

Modification of First Embodiment

As shown in FIG. 1, an example in which the capacitor 511 and the capacitor 512 are connected in series on the switching element 41 side of the first capacitor circuit group 51 and the switching element 41 side of the second capacitor circuit group 52 is described in the first embodiment.

Figure 3:
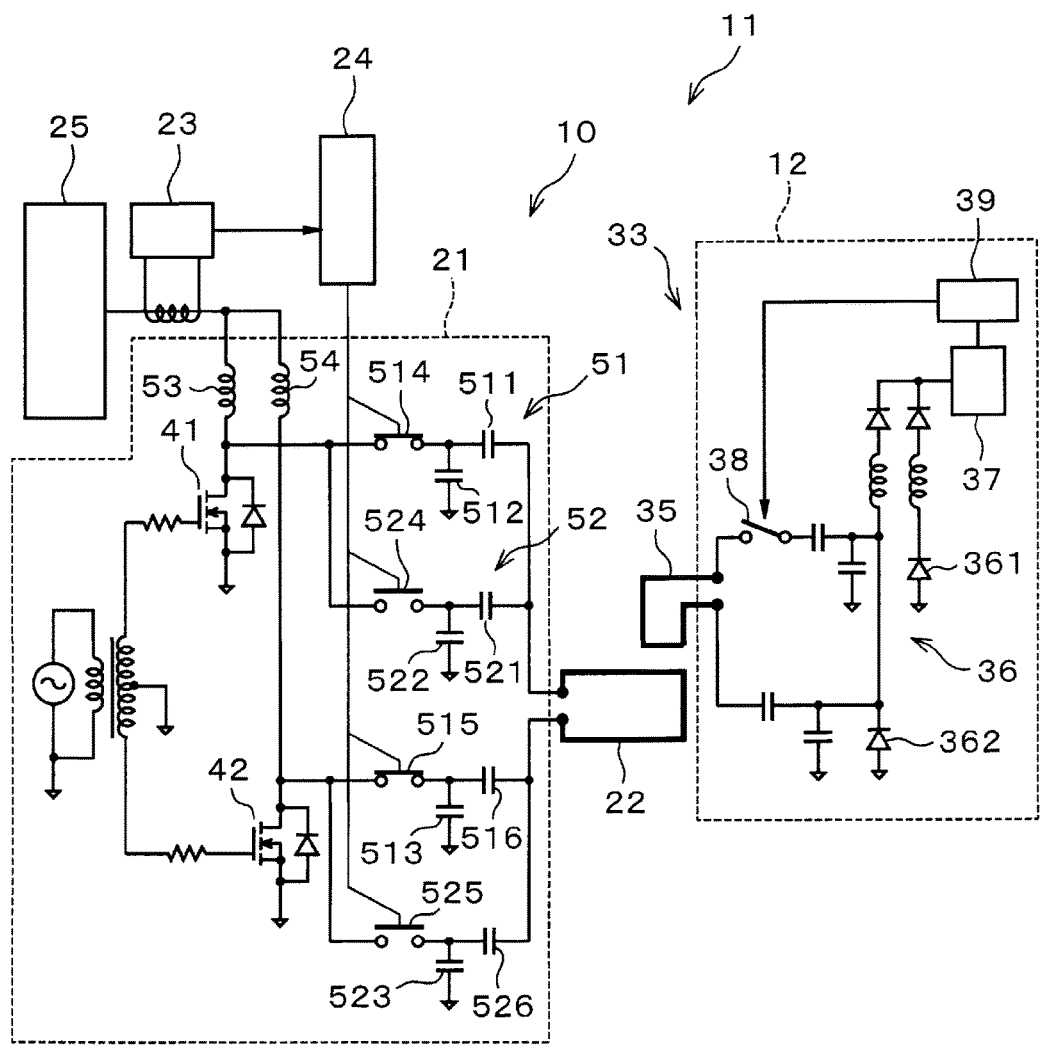
FIG. 3 shows a schematic diagram of an electrical circuit of a power transmission unit of a wireless power feeding device according to a modification of the first embodiment.

However, as shown in FIG. 3, in addition to the capacitor 511 on the switching element 41 side, the first capacitor circuit group 51 may include a capacitor 516 connected in series with the power transmission coil 22 on the switching element 42 side.

Similarly, in addition to the capacitor 521 on the switching element 41 side, the second capacitor circuit group 52 may include a capacitor 526 connected in series with the power transmission coil 22 on the switching element 42 side.

In this way, the capacitor 516 and the capacitor 526 may be connected in series with the power transmission coil 22 on the switching element 42 side in the first capacitor circuit group 51 and the second capacitor circuit group 52.

By adding the capacitor 516 and the capacitor 526 to the first capacitor circuit group 51 and the second capacitor circuit group 52, the setting of the impedance can be performed more precisely, and the accuracy of the impedance optimization and the power transmission efficiency can be improved.

Further, the drive signals of the two switching elements 41 and 42 are mutually inverted, and the two switching elements 41 and 42 are connected to the power transmission coil 22 in the first embodiment. As a result, voltages are alternately applied to both ends of the power transmission coil 22.

Therefore, the current flowing through the power transmission coil 22 can be increased, and the transmission efficiency can be improved.

The capacitor circuit groups are connected to the drains of the two switching elements 41 and 42. The capacitance of each capacitor constituting the capacitor circuit groups is uniquely determined by the above-mentioned equations.

Therefore, it is easy to set the capacitance of each capacitor according to the number of moving bodies 12, and it is possible to miniaturize the capacitor circuit groups, thereby enabling downsizing of a mounting size.

Furthermore, it is possible to cope with a change in impedance by merely adding a circuit of the same configuration as a capacitor circuit group in the high frequency generation unit 21 of the first embodiment.

Therefore, it is possible to facilitate the circuit design according to the impedance which changes according to the number of the moving bodies 12.

It should be noted that in contrast to the first embodiment, the first capacitor circuit group 51 and the second capacitor circuit group 52 may be connected in series to the capacitor 516 and the capacitor 526 on the side of the switching element 42 of the power transmission coil 22, and the capacitor 511 and the capacitor 521 on the switching element 41 side of the power transmission coil 22 may be omitted.

In this manner, the arrangement of the respective capacitors can be arbitrarily changed according to the characteristics of the target moving body 12.

Second Embodiment

Figure 4:
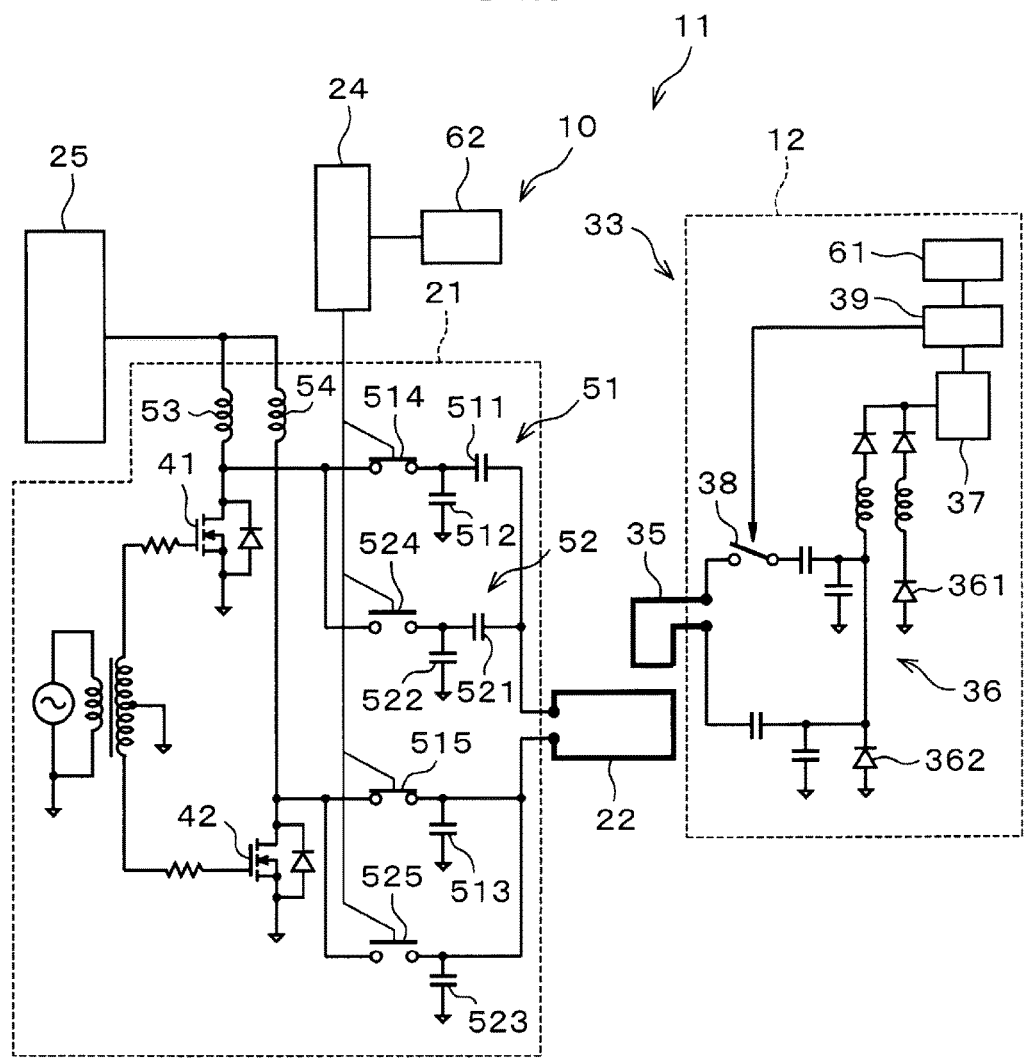
FIG. 4 shows a schematic diagram of an electrical circuit of a power transmission unit of a wireless power feeding device according to a second embodiment.

FIG. 4 shows a wireless power feeding device to which a power transmission unit according to a second embodiment is applied.

As shown in FIG. 4, the wireless power feeding device 11 according to the second embodiment includes a storage unit 61. The storage unit 61 is disposed in a mobile unit 12 and stores specification of the mobile unit 12.

The storage unit 61 has, for example, a two-dimensional bar code, a storage medium, and the like. The storage unit 61 is not limited thereto, but any configuration can be applied as long as it can store the specification of the mobile unit 12.

Further, the specification of the moving body 12 is, for example, a capacity of a battery 37 disposed in the moving body 12, a unique number assigned to each individual of the moving body 12, or the like.

The specification of the moving body 12 is not limited to these examples, and any identifier can be used as long as the moving body 12 can be identified.

The power transmission unit 10 includes a reading unit 62. The reading unit 62 is connected to a control unit 24 of the power transmission unit 10.

The reading unit 62 reads the specification of the moving body 12 stored in the storage unit 61 disposed in the moving body 12, and outputs the specification to the control unit 24.

For example, when the storage unit 61 is a two-dimensional bar code, the reading unit 62 optically reads the storage unit 61.

Further, when the storage unit 61 is storage medium, for example, the reading unit 62 reads the data stored in the storage unit 61 by contact or non-contact.

The control unit 24 operates switches 514, 515, 524, and 525 based on the specification specific to the moving body 12 read by the reading unit 62. That is, by reading the specification of the moving body 12 stored in the storage unit 61 by the reading unit 62, the control unit 24 can acquire not only the number of the moving bodies 12 but also the impedance characteristics of each moving body 12.

The control unit 24 switches the switches 514, 515, 524, and 525 in accordance with the specification of each of the moving bodies 12 read by the reading unit 62 in this manner, and the control unit 24 selects a capacitor circuit group according to the number and characteristics of the moving bodies 12.

In the second embodiment, the control unit 24 controls the switches 514, 515, 524, and 525 according to the specification of the moving body 12 read by the reading unit 62 from the storage unit 61 disposed in the moving body 12.

Electrical characteristics of devices to be mounted in the mobile unit 12 are different for each individual.

When electrical power received from the power transmission coil 22 by the moving body 12 is stored in the battery 37, for example, electrical characteristics are different for each specification of the battery 37, and impedance is also different.

Therefore, the storage unit 61 stores the characteristics of each individual of the moving body 12.

Then, the control unit 24 selects the optimized capacitor circuit group according to the characteristics of each individual of the moving body 12. That is, the control unit 24 automatically controls the switches 514, 515, 524, and 525 according to not only the number of the moving bodies 12 but also the electrical characteristics thereof.

Therefore, even if the number of moving bodies 12 varies, the impedance can be optimized promptly and reliably, and the power transmission efficiency can be improved.

Third Embodiment

Figure 5:
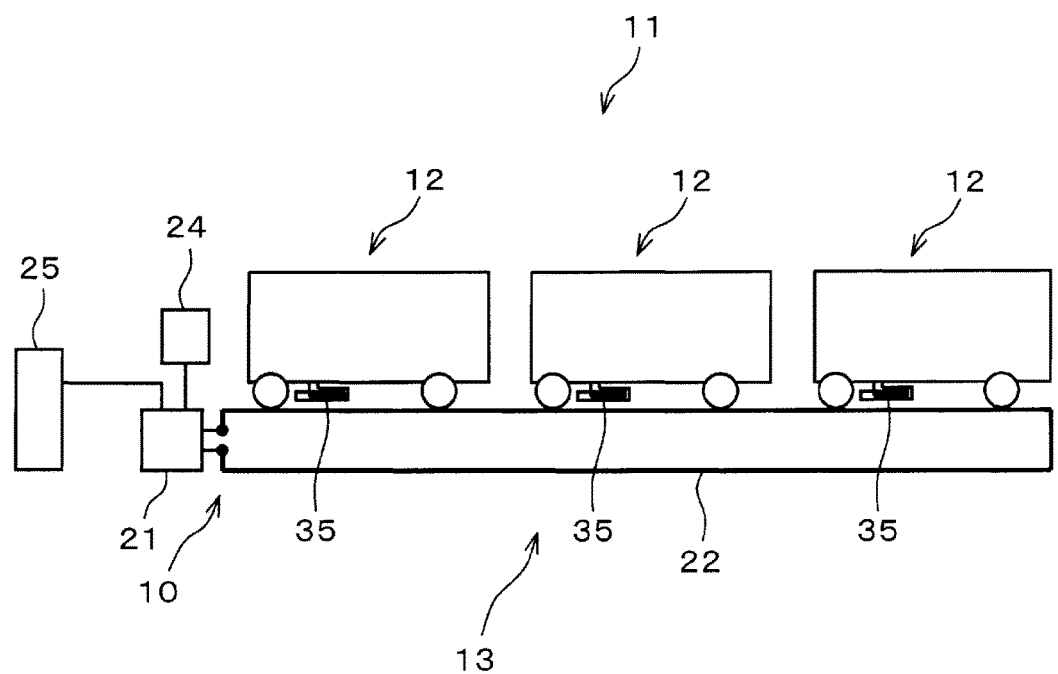
FIG. 5 shows a schematic diagram of a charging system to which a power transmission unit of a wireless power feeding device according to a third embodiment is applied.

FIG. 5 shows a wireless power feeding device to which a power transmission unit according to a third embodiment is applied.

As shown in FIG. 5, a power transmission coil 22 of a power transmission unit 10 according to the third embodiment is set to a length that allows a plurality of moving bodies 12 to be charged in a charging region 13.

In an example shown in FIG. 5, the power transmission coil 22 is set to a length that allows three moving bodies 12 to be charged simultaneously.

In a case of wireless feeding utilizing magnetic field resonance, an impedance decreases at a portion where the power transmission coil 22 and a power receiving coil 35 are opposed, and power is transmitted from the power transmission coil 22 to the power receiving coil 35.

That is, even if the power transmission coil 22 is set to the full length corresponding to the three moving bodies 12 as in the third embodiment, the power transmission coil 22 does not oscillate in all the regions of the entire length, but the oscillation for the magnetic field resonance is generated at a portion where the power transmission coil 22 faces the power receiving coil 35.

In this manner, the length of the region where the magnetic field resonance occurs in the power transmission coil 22, that is, the region where the impedance of the power transmission coil 22 decreases varies depending on the number of the moving bodies 12.

When the number of moving bodies 12 subject to power transmission is three, for example, a region where the magnetic field resonance occurs in the power transmission coil 22 becomes longer than when the moving body 12 is two.

Therefore, the control unit 24 detects the length at which the magnetic field resonance occurs in the power transmission coil 22, that is, the total length of the operating power transmission coil 22, based on the change in impedance in the power transmission coil 22.

The control unit 24 can detect the number of the moving bodies 12 being fed from the power transmission coil 22 by detecting the change in impedance in the power transmission coil 22.

The control unit 24 detects the number of the moving bodies 12 based on the length of the impedance changing area of the power transmission coil 22, and based on the number of the moving bodies 12 detected, the control unit 24 opens and closes the switches 514, 515, 524, and 525 disposed in the high frequency generation unit 21.

Thereby, the control unit 24 switches the capacitor circuit groups of the high frequency generation unit 21 according to the impedance which changes according to the number of the moving bodies 12.

In the third embodiment, the control unit 24 detects the number of moving bodies 12 by detecting the impedance of the power transmission coil 22 without using a current sensor 23, a reading unit 62, or the like.

Then, the control unit 24 switches the capacitor circuit groups by operating the switches 514, 515, 524, and 525 disposed in the high frequency generation unit 21 based on the detected number of moving bodies 12.

Therefore, even if the capacitor circuit groups are switched with a simpler circuit configuration and the number of the moving bodies 12 is varied, the impedance can be optimized promptly and reliably and the power transmission efficiency can be improved.

It should be noted that although an example in which the total length of the charging region 13 is set corresponding to the three moving bodies 12 has been described in the third embodiment, the total length of the charging region 13 may be set corresponding to any number of two or more moving bodies 12.

Fourth Embodiment

Figure 6:
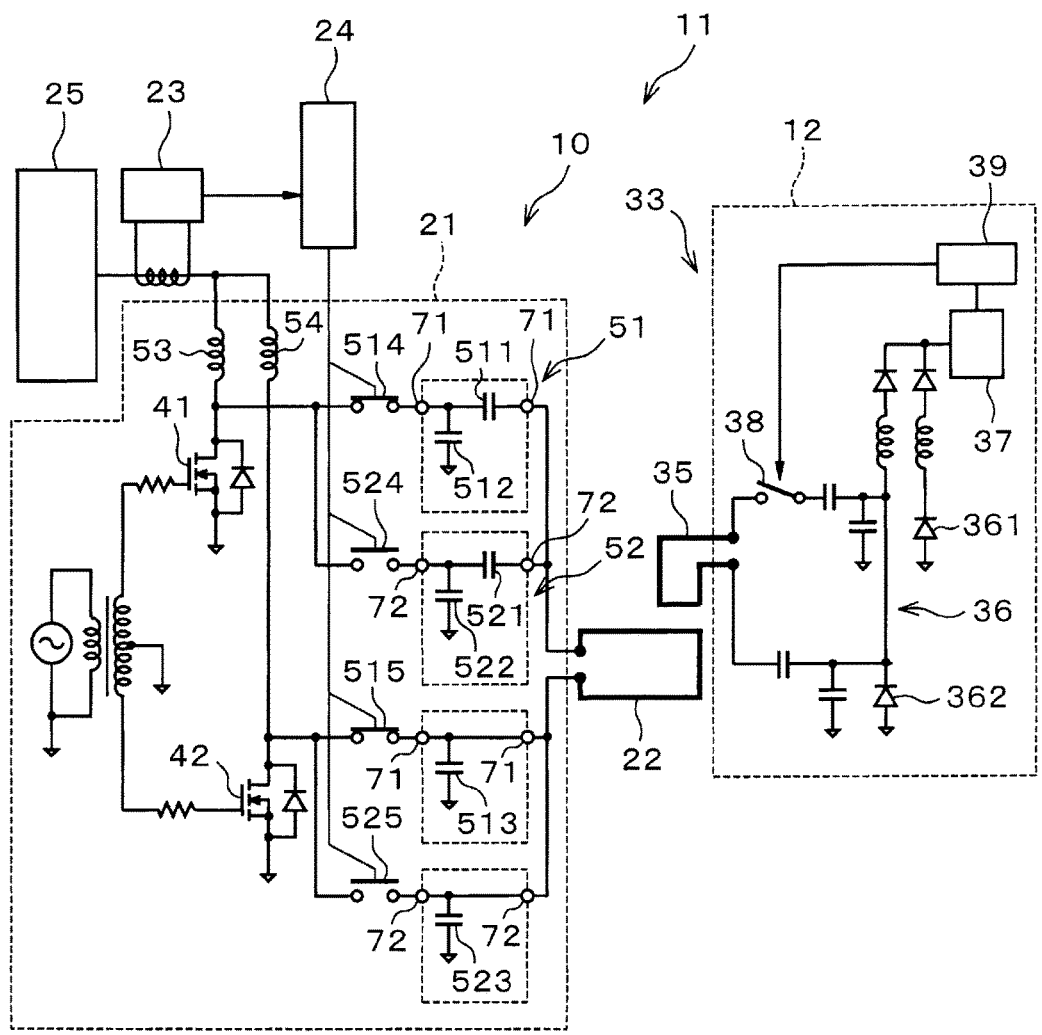
FIG. 6 is a schematic diagram of an electrical circuit of a power transmission unit of a wireless power feeding device according to a fourth embodiment.

FIG. 6 shows a wireless power feeding device to which a power transmission unit according to a fourth embodiment is applied.

In a case of the fourth embodiment shown in FIG. 6, a first capacitor circuit group 51 and a second capacitor circuit group 52 of a power transmission unit 10 can be electrically separated from an electrical circuit which is a basis of a high frequency generation unit 21.

That is, the first capacitor circuit group 51 and the second capacitor circuit group 52 can be attached to and detached from the high frequency generation unit 21 by connecting sections 71, 72 such as couplers, slots, connectors, and the like.

Specifically, in a case of an example shown in FIG. 6, capacitors 511, 512, 513 of the first capacitor circuit group 51 can be separated from surrounding electrical circuits by the connecting sections 71. Similarly, capacitors 521, 522, 523 of the second capacitor circuit group 52 can be separated from the surrounding electrical circuit by the connection sections 72.

In this case, the capacitors 511, 512, 513 of the first capacitor circuit group 51 are installed on a single substrate and can be configured to be separated from the electrical circuit as the basis of the high frequency generation unit 21 by the substrate. Similarly, the capacitors 521, 522, and 523 of the second capacitor circuit group 52 are installed on another single substrate and can be configured to be separated from the electrical circuit that is the basis of the high frequency generation unit 21 by the other substrate.

In the fourth embodiment, when impedance characteristics of a moving body 12 are changed, the impedance can be optimized by replacing a substrate to which capacitors are disposed, for example, without changing the electrical circuit which is the basis of the power transmission unit 10 such as the switching elements 41, 42 of the high frequency generation unit 21 and the power transmission coil 22.

Therefore, it is possible to easily optimize the impedance according to the characteristics of the moving body 12.

The present disclosure described above is not limited to the above-described embodiments, and can be applied to various embodiments without departing from the scope thereof.

Although the present disclosure has been described in accordance with the embodiments, it is understood that the present disclosure is not limited to the embodiments and structures.

The present disclosure encompasses various modifications and variations within the equivalent scope.

In addition, various combinations and forms, as well as other combinations and forms including only one element, more than one, or less, in them are also within the scope and idea of the present disclosure.

What is claimed is:

1. A power transmission unit of a wireless power feeding device disposed on a structural surface of a facility for wirelessly supplying electrical power using magnetic field resonance to two or more moving bodies moving on the structural surface, the power transmission unit of the wireless power feeding device comprising:
    a power transmission coil opposing a power receiving coil disposed in the moving body;
    a high frequency generation unit having switching elements and generating a high frequency power to be supplied to the power transmission coil;
    two or more sets of capacitor circuit groups having series capacitors connected in series with the power transmission coil and parallel capacitors connected in parallel with the switching elements, the capacitor circuit groups are disposed according to the number of the moving bodies and are set together with the power transmission coil so as to have different impedances to each other; and
    a control unit that controls a switch for connecting and disconnecting the capacitor circuit groups according to the number of the moving bodies to which electrical power is supplied from the power transmission coil.

2. The power transmission unit of the wireless power feeding device according to claim 1, wherein,
    the power transmission unit further includes a current sensor for detecting a current flowing from a main power source to the power transmission coil; and
    the control unit controls the switch according to the current flowing from the main power source to the power transmission coil detected by the current sensor.

3. The power transmission unit of the wireless power feeding device according to claim 1, wherein,
    the power transmission unit further includes a storage unit disposed in the moving body and stores specification of the moving body; and a reading unit that reads the specification of the moving body stored in the storage unit; wherein, the control unit controls the switch according to the specification of the moving body read from the storage unit by the reading unit.

4. The power transmission unit of the wireless power feeding device according to claim 1, wherein, the control unit controls the switch according to a length of the power transmission coil.

5. The power transmission unit of the wireless power feeding device according to claim 1, wherein, a capacitance Cc of the series capacitors and a capacitance Cl of the parallel capacitors are determined based on the following equation, $$Cc = \frac{\omega}{2Q_L}\left(l_1 - \frac{M^2}{l_2} - \frac{2Q_L}{\omega} \cdot R_c\right) \quad \text{[Math. 1]}$$

$$Cl = \frac{\alpha \cdot Q_L}{\omega^2 \cdot L} - C_{oss}$$

$$L = \frac{1}{2}\left(l_1 - \frac{1}{\omega^2 \cdot Cc} - \frac{M^2}{l_2}\right)$$

where $\omega$ is an angular velocity, and when the oscillation frequency is $f_0$, $\omega = 2nf_0$ is calculated; $Q_L$ is a circuit resonance value; $I_1$ is an inductance of a power transmission coil; $I_2$ is an inductance of a receiving coil; M is a mutual inductance, and $M = k(I_1 \times I_2)^{1/2}$; $R_c$ is an impedance of a circuit; $C_{oss}$ is an output capacitance of a switching element; $\alpha$ is a coefficient, which is a characteristic value of a oscillation circuit; and L is an inductance of a power transmission coil.

6. The power transmission unit of the wireless power feeding device according to claim 1, wherein, the capacitor circuit groups are electrically detachable from the high frequency generation unit.

7. The power transmission unit of the wireless power feeding device according to claim 1, wherein, the switching elements of the high frequency generation unit are two MOSFETs connected to the main power source via choke coils and driven in mutually opposite phases;

drains of the two MOSFETs are connected to the power transmission coil via the series capacitors and the parallel capacitors;

the parallel capacitors are connected to each of the two MOSFETs; and the control unit controls the switch that connects and disconnects between the capacitor circuit groups including the series capacitors and the parallel capacitors connected to each of the two MOSFETs.

* * * * *